United States Patent [19]

Baranyi

[11] 4,142,426
[45] Mar. 6, 1979

[54] HYPOTROCHOIDAL PLANETARY GEAR SPEED CHANGERS

[75] Inventor: Sandor J. Baranyi, Ithaca, N.Y.

[73] Assignee: Trochoidal Gear Technology, Inc., Ithaca, N.Y.

[21] Appl. No.: 735,386

[22] Filed: Oct. 26, 1976

[51] Int. Cl.$^2$ .............................................. F16H 1/28
[52] U.S. Cl. ....................................................... 74/801
[58] Field of Search .............. 74/801, 785, 797, 750 R

[56] References Cited

U.S. PATENT DOCUMENTS

| | | | |
|---|---|---|---|
| 1,320,530 | 11/1919 | Buehler | 74/801 |
| 2,218,838 | 8/1940 | Alspaugh | 74/801 |
| 2,434,678 | 1/1948 | Szceniowski | 74/801 |
| 2,851,905 | 9/1958 | Clark | 74/801 |
| 2,868,037 | 1/1959 | Hindmarch | 74/801 |
| 3,222,954 | 12/1965 | Wuertz | 74/801 |
| 3,513,715 | 5/1970 | Whitfield | 74/801 |
| 3,596,538 | 8/1971 | Braun | 74/801 |
| 3,906,818 | 9/1975 | Benthake | 74/801 |
| 4,016,825 | 4/1977 | Pichl | 74/801 |

OTHER PUBLICATIONS

Merritt, Gear Engineering, Pitman Pub. Co., 1971, Chapter 11.

Primary Examiner—Benjamin W. Wyche
Assistant Examiner—R. C. Turner
Attorney, Agent, or Firm—Shlesinger, Fitzsimmons & Shlesinger

[57] ABSTRACT

Each of several types of speed changers comprise a pair of generally dish-shaped housing sections releasably secured in confronting relation around their peripheries with a high speed shaft journaled in an axial bore of one section, and a low speed shaft or hub journaled in the other section coaxially of the high speed shaft. At least one two-step cluster gear is secured to the inner end of the high speed shaft and has a pinion section drivingly engaged with a set (three) of two-step planetary cluster gears that are rotatably mounted on three shafts that are fixed at opposite ends in a pair of circular carrier plates which also are journaled coaxially in the housing sections to be rotatable therein in unison. The pinion sections of the planetary cluster gears are drivingly engaged with the teeth of an internal sun gear secured in the housing coaxially thereof. A feature of the invention is that merely by adding additional sets of driving and planetary cluster gears to a unit, all which gears may be similar in construction, various ratios of speed change can be achieved inexpensively.

10 Claims, 6 Drawing Figures

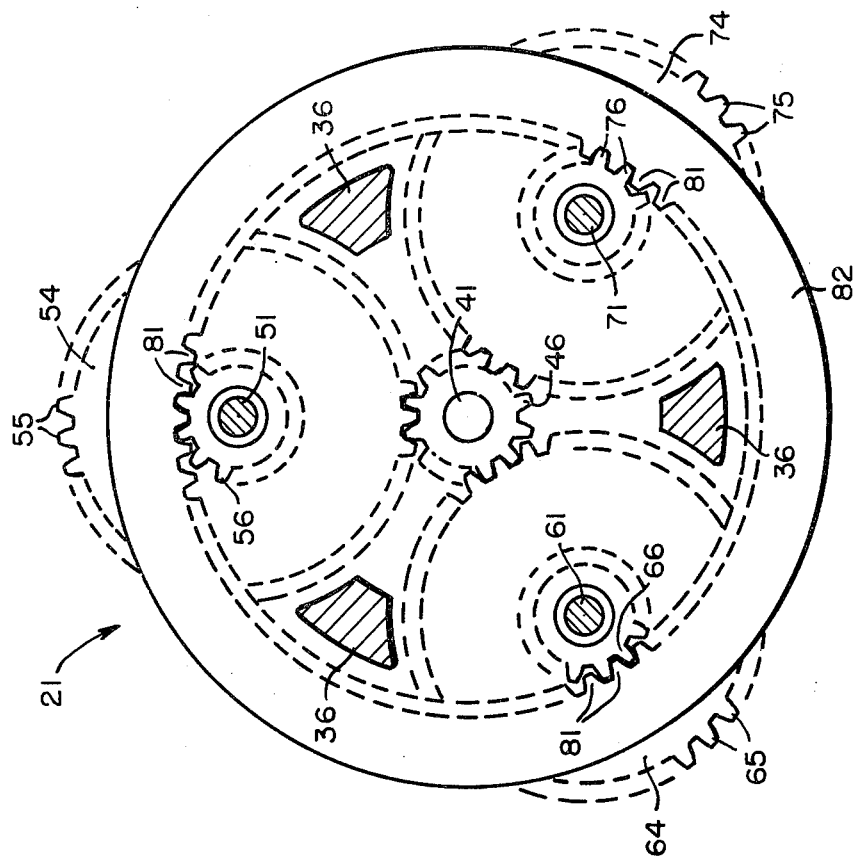
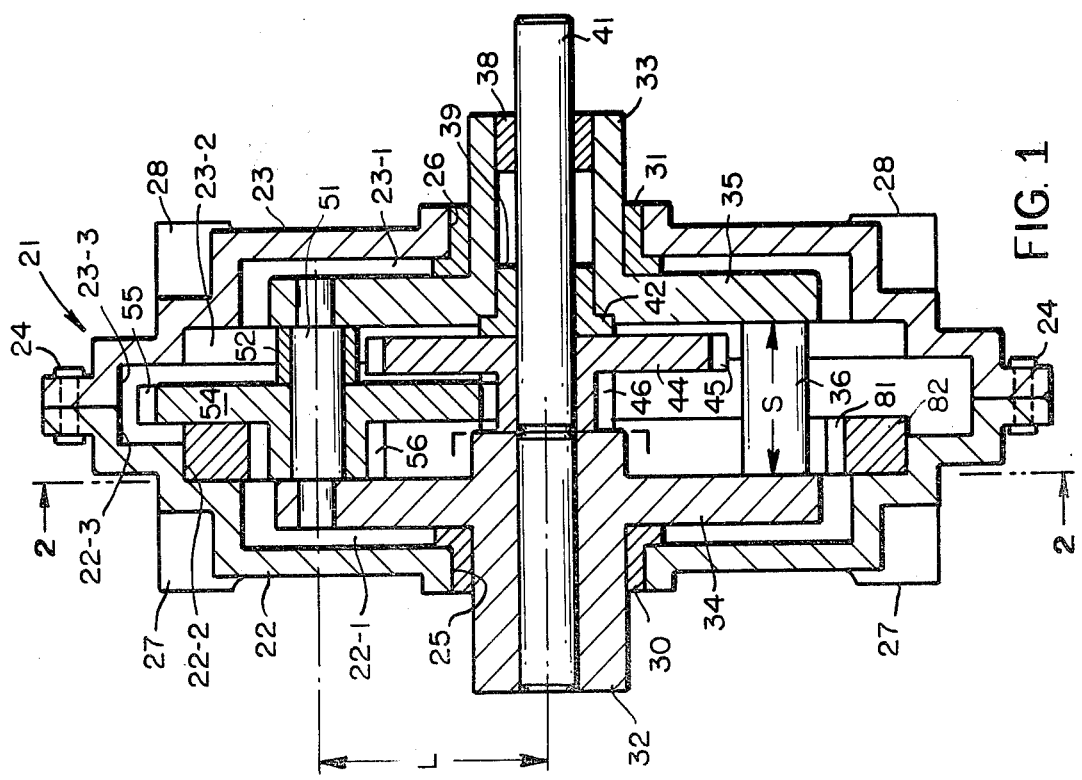
FIG. 2
FIG. 1

HYPOTROCHOIDAL PLANETARY GEAR SPEED CHANGERS

The present invention is related to gear type rotary speed reducers and multipliers, and more particularly to reducers and multipliers of the type which use multistep cluster gear arrangements. Even more particularly, this invention relates to reducers and multipliers of the type described wherein even multiples of the cluster gear arrangements are utilized to transmit motion between coaxially disposed input and output shafts.

Heretofore it has been customary for various applications, in reversible gear drive mechanisms, for example, to use a planetary system in which an internal ring gear is drivingly engaged with planetary cluster gears, which rotate about their own, spaced axes at the same time that they revolve around the axis of the ring gear. A major disadvantage of these known systems has been the excessive cost involved in producing them. Where such systems are designed for use as speed changers, these costs escalate almost proportionately with the increase in the size or capability of the unit. Moreover, such changers have tended to be rather noisy and unreliable, particularly where high speed ratios are involved.

A main object of this invention, therefore, is to provide a speed changer which is highly reliable, efficient and quiet in operation even in extremely high speed-ratio applications.

A further object of this invention is to provide a speed changer which is very compact in size, partly due to the use of at least one internal gear per unit, and partly due also to the use of multiple planet arrangements.

It is an object also to provide a speed changer of the type described which can be produced very economically.

Other objects of this invention include the provision of speed changers having low inertia effects for quick response for start-ups and stops, high over-load carrying capabilities, and substantially maintanance-free and long service life characteristics.

Still other features and advantages of the present invention will become apparent to those skilled in the art and from a reading of the following description and in conjunction with the accompanying drawings, wherein:

FIG. 1 is a longitudinal sectional view taken along the axis of a speed changer made according to a first embodiment of the invention;

FIG. 2 is a sectional view taken along the line 2—2 in FIG. 1 looking in the direction of the arrows, but with both halves of the speed changer housing removed;

Figure 3:
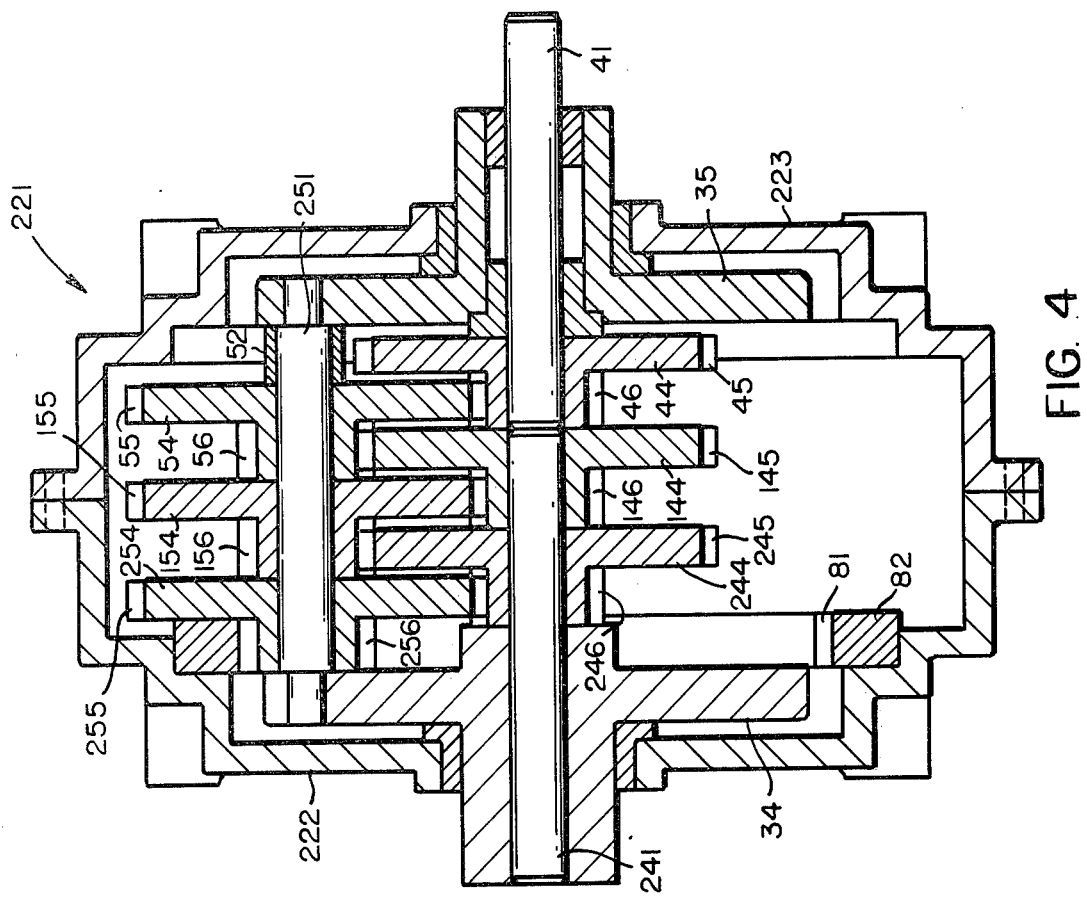
FIG. 3 is a longitudinal sectional view taken along the axis of a speed changer generally similar to the one shown in FIG. 1, except for the use of two additional and serially intermeshed cluster gears between its output planet and drive gears.

Referring now to the drawings by numerals of reference, and first to the embodiment shown in FIGS. 1 and 2, the numeral 21 denotes generally a speed changer housing, comprising two identical, generally dish-shaped end plates or housing halves 22 and 23, which are secured together around their edges by bolts 24, or by any other suitable means, so that the recessed faces of these plates are disposed in confronting, coaxial relation. Plates 22 and 23 have therethrough coaxial bores 25 and 26, respectively, and have in their confronting surfaces a plurality of coaxial counterbores denoted at 22-1, 22-2, and 22-3 in plate 22, and at 23-1, 23-2, and 23-3 in plate 23. Raised portions 27 and 28 on the end plates 22 and 23, respectively, can be provided with tapped holes, or the like, for use in mounting the housing adjacent the associated driving and driven mechanisms (not illustrated).

Secured in the bores 25 and 26 of the end plates coaxially thereof are two sleeve bearings 30 and 31, respectively. Mounted to rotate in the bearings 30 and 31 coaxially thereof are the hubs 32 and 33, respectively, of two, axially-spaced, circular wheels or planet carriers 34 and 35, which rotate coaxially in the end plate counterbores 22-1 and 23-1, respectively. These two wheels 34 and 35 are of equal diameter and are interconnected by means which may include three equiangularly spaced ribs or bracers 36, so that they rotate in unison. As noted hereinafter, these ribs are optional.

Rotatably journaled intermediate its ends in a pair of sleeve bearings 38 and 39, which are secured in the outer and inner ends, respectively, of the bore in hub 33 of carrier 35, is a high speed shaft 41. Bearing 39 has on its inner end an external, circumferential flange 42 which is seated in, and which projects from, a counterbore in the inner end of carrier 35. Shaft 41 projects axially inwardly beyond bearing 39 and terminates adjacent the inner end of the carrier hub 32 coaxially thereof.

Keyed or otherwise secured on shaft 41 between the carrier hub 32 and the sleeve bearing 39 is the hub of a two-step cluster gear 44, which for purposes of description will be referred to as the driving cluster gear. On its end adjacent bearing 39 cluster gear 44 comprises a spur gear section consisting of a plurality of teeth 45 arranged coaxially of shaft 41 on a relatively large pitch diameter; and on its other end this cluster gear has a pinion gear section, which comprises a plurality of teeth 46 of the same size as teeth 45, but which lie on a relatively small pitch diameter.

As shown more clearly in FIG. 2, the teeth 46 forming the pinion section of gear 44 are drivingly engaged with the teeth 55, 65, 75 of the spur gear sections of three, identical, planetary-type cluster gears 54, 64 and 74, which are similar in construction to the two-step cluster gear 44, but the corresponding sections of which do not necessarily have the same number of teeth or pitch diameter, etc. The cluster gears 54, 64 and 74 are rotatably mounted on three, identical, parallel shafts or pins 51, 61 and 71 (FIG. 2), which extend transversely between the confronting faces of the carrier plates 34 and 35 with their axes disposed at equiangularly spaced points around the common axis of these plates, and at a common radial distance L (FIG. 1) therefrom. Each of these pins 51, 61 and 71 is longer than the hub of the associated cluster gear, and has reduced-diameter ends which are press fit or otherwise secured in registering openings in the carrier plates 34 and 35 so that the plates are accurately held in spaced, confronting relation to one another by these shafts. For this reason it is not absolutely necessary that the ribs 36 also be employed to interconnect the carrier plates 34 and 35. The distance between the confronting faces of the carrier plates 34 and 35 is denoted by the letter S in FIG. 1.

Also mounted on each pin 51, 61 and 71 coaxially thereof, and positioned between each cluster gear 54, 64, 74 and the face of the carrier plate 35 is an annular spacer 52, only one of which is shown in FIG. 1. The spacers 52 register axially with, and are radially spaced from, the cluster gear teeth 45, which in the embodiment illustrated are not used for transmitting any power.

The pinion teeth 56, 66 and 76 of the planetary cluster gears 54, 64 and 74 are drivingly engaged with the teeth 81 of an internal ring gear 82, which is secured coaxially in the counterbore 22-2 in the housing section 22. The outer face of ring gear 82, which in the embodiment illustrated functions as a sun gear, is disposed in confronting relation to the spur gear sections of the planetary cluster gears 54, 64, 74, but does not interfere with the rotation of the planetary gears on their respective shafts 51, 61 and 71.

In use, shaft 41 may be connected in any conventional manner to a prime mover, for example to an engine shaft (not illustrated). To calculate the possible speed ratios which can be achieved by the apparatus shown in FIGS. 1 and 2, let the letters A, B, E and F represent the sizes (e.g. number of teeth or pitch diameter in inches) of, respectively, the gear 82 (sun gear), the pinion gear section of any one of the identical planetary gears as represented by the teeth 56, 66 or 76, the spur gear section of any of the three planetary gears as represented by the teeth 55, 65 or 75, and the pinion section of cluster gear 44 as represented by teeth 46. Then, the speed ratio can be determined by inserting the values of A, B, E and F into the following formula: $R_c = 1 + (AE/BF)$, where Rc equals the speed ratio.

For example, assuming that $A=60$, $B=12$, $E=36$ and $F=12$, as an example used for illustration, to calculate the corresponding speed ratio $R_c$ the above values of A, B, E and F are inserted in the above formula, whereby $R_c = 1 + (60/12)(36/12) = 16$, which represents the ratio of the angular speed of the high-speed shaft 41 to the angular speed of the carrier plates 34 and 35, and hence the output hub 32. As a quick numerical check for the correctness of the mesh conditions of gears A, B, E and F per FIGS. 1 and 2, and assuming the same pitch size teeth in all four intermeshed gears in this example, it is clear that, $E + F = 36 + 12 = 48$, and $A - B = 60 - 12 = 48$, which checks for a single value of distance L for the output planets in FIGS. 1 and 2.

It may also be noted that both static and dynamic balancing of the system shown in FIGS. 1 and 2 are achieved by the multi-planet arrangement with high load carrying capabilities. Similarly fully balanced arrangement is obtainable with other multi-planet arrangements, e.g. by using two planets (e.g. 54 and 64) 180 degrees apart rather than the three illustrated planets 54, 64 and 74. For the balancing of a single-planet structure, however, a counter-balance weight should be employed between plates 34 and 35 opposite the single planet.

Referring now to FIG. 3, 121 denotes a modified housing containing the same elements as previously described for the unit in FIG. 1, together with an additional cluster gear 144 similar to gear 44, and a second set of planetary gears one of which is denoted at 154. Gear 154 rotates on a pin 151 which is similar in function to pin 51 but is slightly longer so that gears 54 and 154 can rotate thereon between the modified carrier plates 34, and 35. Two additional planetary gears (not illustrated) are also mounted on pins similar to, but slightly longer than, pins 61 and 71, to complete the second set of planetary gears. Also, an additional pin 141 is secured in and projects from the inner end of the bore in the carrier hub 32 to support the additional cluster gear 144 in a coaxial manner relative to the carrier plates, and the entire structure in FIG. 3 for that matter.

Sun gear 82 and cluster gears 144 and 154 in FIG. 3 can be exactly as the corresponding counterparts 82, 44 and 54 in FIG. 1. Now, by designating the gears 81, 156, 155, 146, 145, 56, 55 and 46 by A, B, E to J, respectively, and assuming $A = 60$, $B = 12$, $E = 36$, $F = 12$ as before, and for the sake of simplicity, let $G = I = 36$, and $H = J = 12$, then these values can be inserted into the general formula for the speed ratio now written as $$R_c = 1 + \frac{A}{B}\frac{E}{F}\frac{G}{H}\frac{I}{J} =$$
$$1 + \frac{60}{12}\frac{36}{12}\frac{36}{12}\frac{36}{12} = 136.$$

Note that, of course, clusters 154, 144 and 54 can ride on their shafts freely, that is without keying or other means of attachment, while the cluster gear 44 of course is to be fixed onto its cylindrical supporting shaft 41 to provide the combined high-speed pinion and shaft member for the unit shown in FIG. 3.

Figure 4:
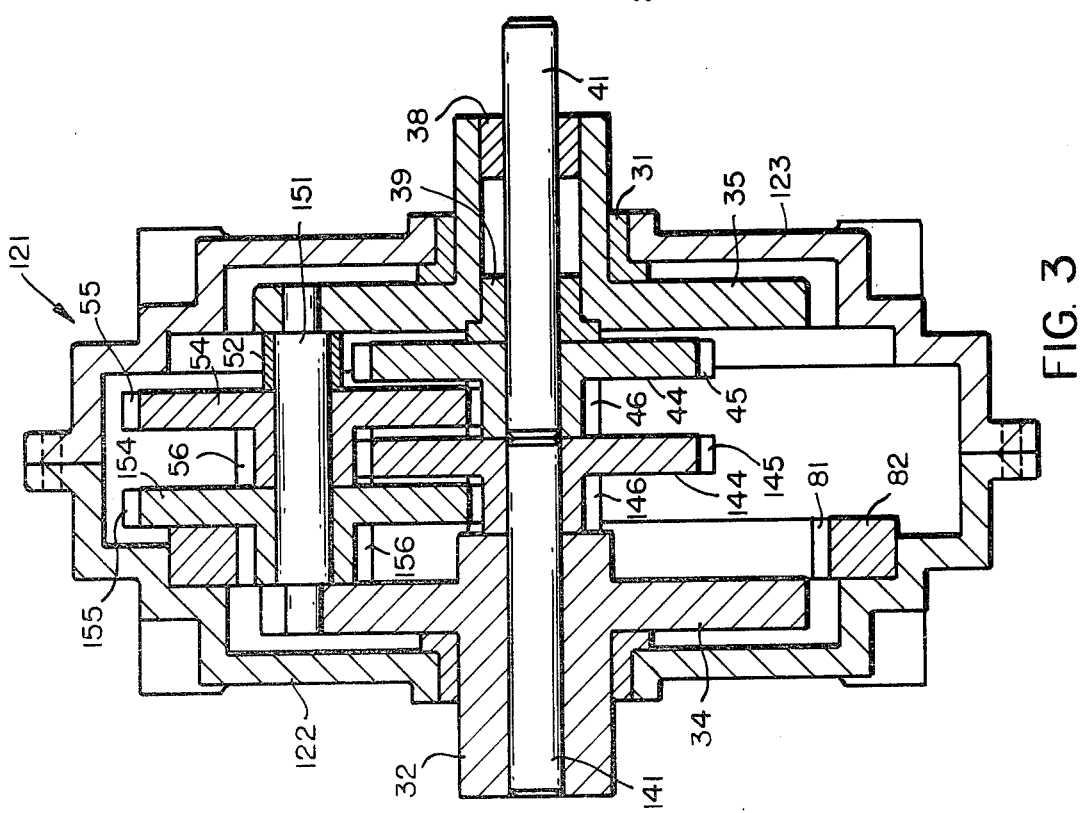
FIG. 4 is a longitudinal sectional view taken along the axis of a speed changer generally similar to the one shown in FIG. 1, except for the use of four additional and serially intermeshed cluster gears between its output planet and drive gears.

Referring now to FIG. 4, the elements are shown to be very much the same as that of the previously described unit in FIG. 3, except that it includes still a third driving cluster gear 244 mounted on shaft 241 adjacent the second drive cluster 144, plus one additional set of planetary cluster gears only one of which is shown at 254. Gear 254 rotates on a shaft 251 which is similar to but greater in length than shaft 151. Gears 81, 256, 255 and 246 in FIG. 4 can be axactly as their corresponding counterparts in FIG. 1. Now designate gears 81, 256, 255, 246, 245, 156, 155, 146, 145, 56, 55, and 46 by A, B, E to N, respectively. For a numerical example now, assume $A=60$, $B=12$, $E=36$ and $F=12$ as before, and for the sake of simplicity let $G=I=K=M=36$, and $H=J=L=N=12$, which values can be inserted into the general formula for the speed ratio which can now be written as, $$R_c = 1 + \frac{A}{B}\frac{E}{F}\frac{G}{H}\frac{I}{J}\frac{K}{L}\frac{M}{N} =$$
$$1 + \frac{60}{12}\frac{36}{12}\frac{36}{12}\frac{36}{12}\frac{36}{12}\frac{36}{12} = 1216.$$

Note that the clusters 254, 244, 154, 144 and 54 can, of course, turn on their shafts freely, that is without keying or other means of attachment, while the gear 44 of course is to be fixed to its shaft 41.

Figure 5:
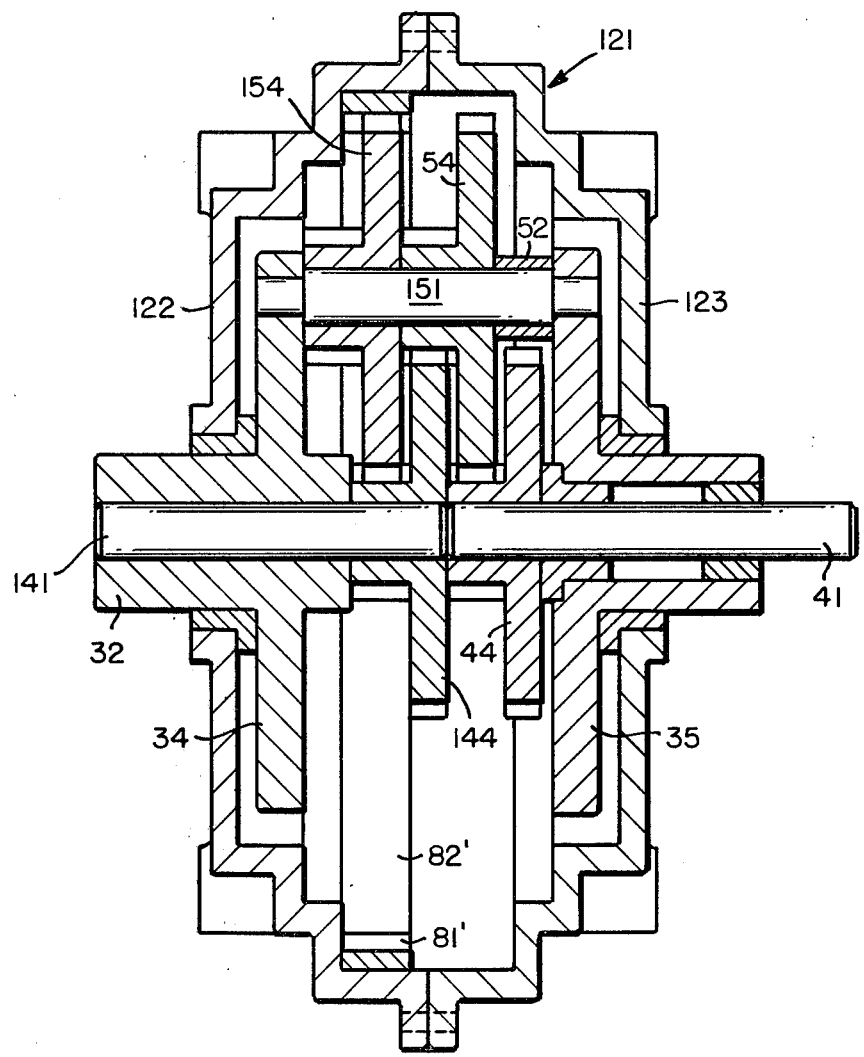
FIG. 5 is a longitudinal sectional view taken along the axis of a speed changer generally similar to the one shown in FIG. 3, except for the larger diameter internal sun gear.

The process of adding multiples of two intermediate clusters to the drive unit in FIG. 1 can be continued, as described in conjunction with FIGS. 3 and 4, to any extent desired in order to achieve higher and higher speed ratios. In an entirely similar manner, another corresponding set of drive units can be obtained by using $E=B$ in the speed ratio formula, which for the cases of drive units per FIGS. 1, 3 and 4 implies that the size of the internal sun gear correspondingly is, $A = 2B+F$, which results $A=84$ for the numerical examples used in conjunction with the drives per FIGS. 1, 3 and 4, and such a drive is shown in FIG. 5 and it can be made up of the same components as the drive in FIG. 3 except for the larger diameter ($A=84$) internal sun gear 82' in FIG. 5, rather than the smaller size ($A=60$) internal sun gear 82 in FIG. 3. Thus the numerical example for the speed ratio of the drive unit 21 shown and described in connection with FIG. 5 can be based on $A=84$, $B=E=G=I=36$ and $F=H=J=12$, which values can now be substituted into the general formula written as before as, $$R_c = 1 + \frac{A}{B} \frac{E}{F} \frac{G}{H} \frac{I}{J} = 1 + \frac{84}{36} \frac{36}{12} \frac{36}{12} \frac{36}{12} = 64$$

for the unit in FIG. 5, versus the previously obtained value of $R=136$ for the unit in FIG. 3, while the only structural difference assumed between the two units is given by the difference between the size of the sun gears. Similar replacement of the $A=60$ internal gears in FIGS. 1 and 4 by the $A = 84$ size internal gear can result in two more new drive units with speed ratio values of $$R_c = 1 + \frac{A}{B} \frac{E}{F} = 1 + \frac{84}{36} \frac{36}{12} = 8 \text{ and,}$$
$$R_c = 1 + \frac{A}{B} \frac{E}{F} \frac{G}{H} \frac{I}{J} \frac{K}{L} \frac{M}{N} =$$
$$1 + \frac{84}{36} \frac{36}{12} \frac{36}{12} \frac{36}{12} \frac{36}{12} \frac{36}{12} = 568,$$

respectively, refer to the two corresponding numerical examples above.

It has thus been shown how slight structural modifications to the drive in FIG. 1 can be accomplished to produce new units such as shown in FIGS. 3 to 5 and other arrangements, for widely different values of speed ratios, yet using the same type components and invovling changes in the overall lengths of the carrier and housing to accomodate a particular number of intermediate cluster gears (i.e. clusters between the input pinion and the planet next to the output member) in pairs. Even though such changes are structurally relatively minor, they normally result in a certain increase in production cost due to higher tooling and inventory expenses. Such unnecessary extra costs can be avoided by using a common housing size and a corresponding carrier, e.g. the housing and the carrier of the four-intermediate-cluster unit per FIG. 4.

As was pointed out before, the drive unit per FIG. 4 could be modified by removing the internal sun gear 82 and by equipping the drive with the internal sun gear 82' used in FIG. 5, also as a fixed sun gear but now in constant mesh with the gear section 255 of the output planet 254 in FIG. 4, in order to provide a drive unit of the speed ratio of 568 rather than 1216, in view of the two pertinent numerical examples presented above.

Figure 6:
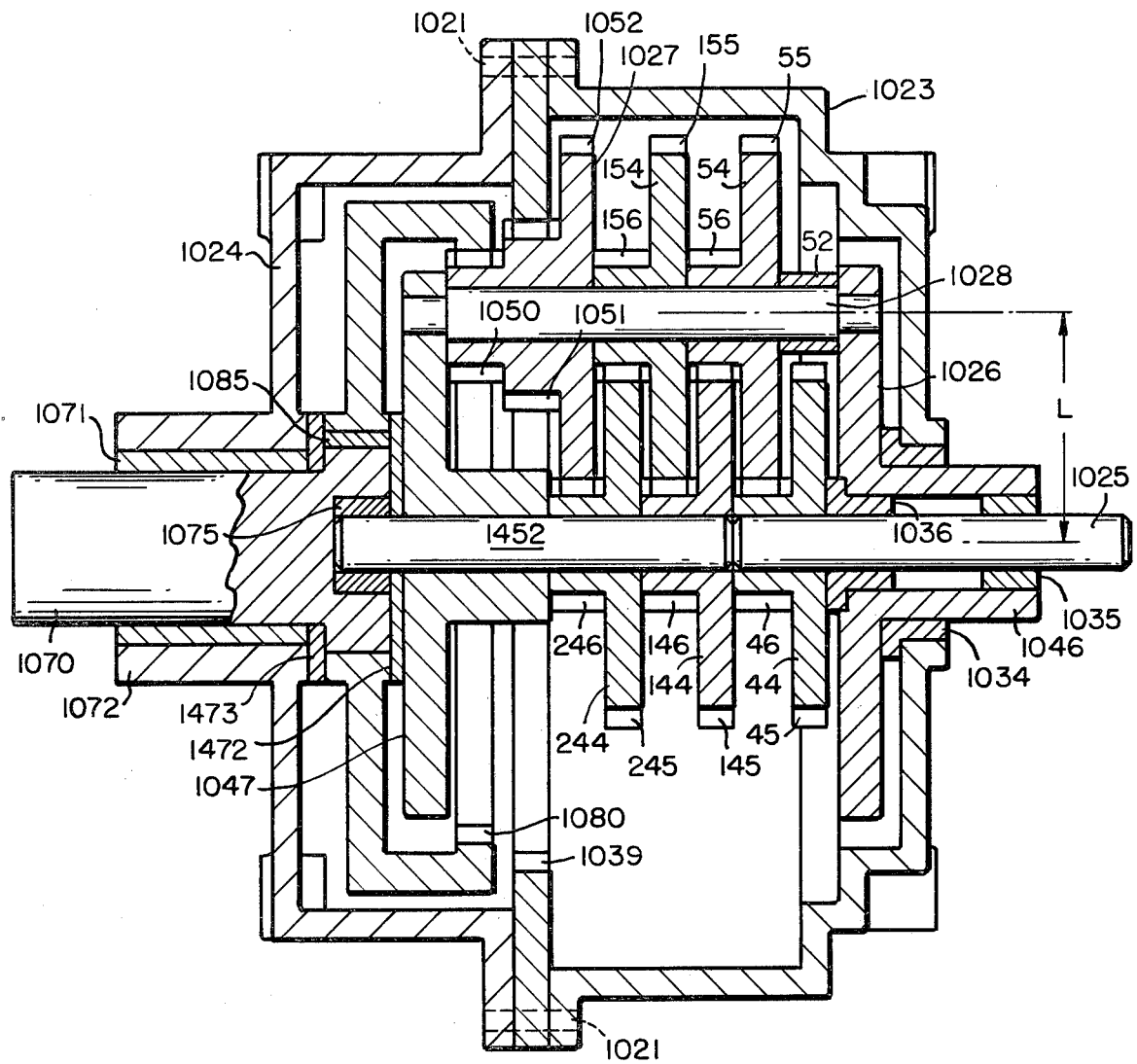
FIG. 6 is a longitudinal sectional view of still another embodiment of the invention which has four serially intermeshed cluster gears between its output planet and drive gears.

Referring now to FIG. 6, the housing of this unit consists of two parts 1023 and 1024 held together by bolts or rivets 1021, or any other suitable means, with the internal sun gear 1039 held between them. Alternatively, this internal gear could be made integral with either 1023 or 1024. Other parts of this speed changer unit include a high-speed pinion and shaft member 1025, planet carrier members 1026 and 1047, a low-speed shaft 1070 journaled in a bearing 1071 secured in the bore of the hub 1072 of housing section 1024, and an internal output gear 1080 secured by a key 1085 on the inner end of shaft 1070 for rotation in housing section 1024 between thrust bearings 1472 and 1473.

As in previous embodiments the hub 1046 of carrier member 1026 rotates in a bearing 1034 in a central bore in housing section 1023, the high-speed shaft 1025 rotates intermediate its ends in a pair of bearings 1035 and 1036 secured in opposite ends of the bore in the carrier hub 1046, and the driving cluster gear 44 is secured on the inner end of shaft 1025.

Unlike the prior embodiments, however, the carrier plate 1047 is secured to a supporting shaft 1452, which is rotatably journaled at one end (left end in FIG. 6) in a bearing 1075 which is secured in an axial bore formed in the inner end of shaft 1070, and which at its opposite end confronts the inner end of shaft 1025 coaxially thereof. As in FIG. 4, two additional two-step cluster gears 144 and 244 are rotatably mounted on shaft 1452 between gear 44 and the left-hand carrier plate 1047. Moreover, three planet gear shafts, one of which is denoted at 1028, extend between carrier plates 1026 and 1047 at equal radial distances L from the central axis of the unit and have rotatably supported thereon three sets of planetary cluster gears, two sets of which are represented by the gears 54 and 154, and which are drivingly engaged with the cluster gears 44 and 144 as in the embodiment shown in FIG. 4.

Each of a third set of planetary cluster gears, one of which is denoted at 1027 in FIG. 6, comprises a three-step cluster gear having, for example as illustrated by gear 1027, three differently sized gear sections 1050, 1051 and 1052. The teeth of section 1052 mesh with the pinion teeth of section 246 on the cluster gear 244; the teeth of section 1051 mesh with the internal gear 1039; and the teeth of section 1050 mesh with the internal output gear 1080.

Having described the drive unit shown in FIG. 6, let A to N represent the sizes (e.g., number of teeth, or pitch diameters in inches, etc.) of gears 1039, 1051, 1050, 1080, 1052, 246, 245, 156, 155, 146, 145, 56, 55 and 46, respectively, and for a numerical example for calculating the speed ratio for the drive unit per FIG. 6 assume gear sizes as follows: $A=66$, $B=18$, $C=F=H=J=L=N=12$, $D=60$, and $E=G=I=K=M=36$, which values can be substituted into the speed ratio formulas written as follows:

$$R_c = 1 + \frac{A}{B} \frac{E}{F} \frac{G}{H} \frac{I}{J} \frac{K}{L} \frac{M}{N} =$$
$$1 + \frac{66}{18} \frac{36}{12} \frac{36}{12} \frac{36}{12} \frac{36}{12} \frac{36}{12} = 892 \text{ and,}$$

$$R = R_c / \left(1 - \frac{A}{B} \frac{C}{D}\right) =$$

$$892 / \left(1 - \frac{66}{18} \frac{12}{60}\right) = 3345,$$

where $R_c$ designates the speed ratio for the planet carrier (i.e. number of revolutions of the high-speed shaft and pinion member 1025 for one full revolution of the planet carriers 1026, 1047 in FIG. 6), while R represents the speed ratio for the entire drive unit (i.e. the number of revolutions of the high-speed shaft and pinion member 1025 for one full revolution of the low-speed shaft 1070 in FIG. 6). As a quick numerical check for the correctness of the mesh conditions of gears A to N per FIG. 6, and assuming the same pitch size teeth in all 14 active gears in this example, it is found that,
$$A-B=D-C=E+F=G+\lambda$$
$$H=I+J=K+L=M+N=48,$$ which checks for a single value of center distance L for the gears as referred to in FIG. 6.

Note that special modifications to the drive unit shown in FIG. 6 are possible. Such possible modifications include $C=0$, which is to say that the low-speed shaft member could be pinned to the carriers, or clearly, such a modification of the drive unit in FIG. 6 is kinematically equivalent to the drive unit shown in FIG. 4. As another example for possible modifications of the unit per FIG. 6 could be by using $E=B$, etc.

A drive unit such as shown in FIG. 6 can also be used either as a dual-input or dual-output unit by utilizing the hub 1046 as an auxuliary input or output shaft. These represent two extra options to its use as a single input or output device, as a special differential arrangement, for instance.

Note that both the output-planets and the intermediate cluster gears, of the drive units which have been described, rotate relative to their own support shafts or pins during the operation of the unit. For this reason the said gears could be provided with individual radial bearing means as well as axial thrust bearing means or equivalent. Note also that axial spacers such as 52 in FIG. 1, for instance, could be made integral with either their supporting shafts in the form of raised shoulders or as ring type extensions of adjacent gears, etc.

Furthermore, although the housing sections of FIGS. 3 and 4 are similar in configuration to, but of greater axial length than those shown in FIGS. 1 and 5, it will be apparent the two housing sections 22 and 23 would be perfectly satisfactory for use in several of the different embodiments provided annular spacers or washers were inserted between their confronting edges to add the necessary length to the chamber in which the carrier plates are mounted.

Having described the preferred embodiments of my invention, further variations will be apparent to those skilled in the art, and therefore, the invention is to be limited not by the specific disclosure herein, but only by the appending claims.

Having thus described my invention, what I claim is:

1. A speed changer, comprising
   a housing
   a pair of spaced cylindrical members journaled in opposite ends, respectively, of said housing to rotate coaxially about a common axis,
   a pair of spaced carrier plates projecting from the inner ends of said members for rotation in a chamber in said housing,
   a plurality of spaced shafts extending between confronting surfaces on said plates parallel to said axis, and equi-spaced radially of, and angularly about, said axis, and operatively connecting said plates and said members for rotation in unison about said axis,
   an internal sun gear secured in said chamber,
   a first group of multi-step planetary cluster gears rotatably mounted on said shafts and each having thereon at least two axially spaced sets of teeth of respectively different pitch diameters, the teeth of one set thereof being drivingly engaged with the teeth of said sun gear,
   a third cylindrical member extending through one end of said housing for rotation coaxially of said axis, and
   a further gear secured to the inner end of said third cylindrical member and having at least one set of teeth thereon drivingly engaged with the teeth of another set of teeth on each of said first group of planetary gears, whereby rotation of said further gear imparts rotation through said planetary and said sun gears to said cylindrical members.

2. A speed changer as defined in claim 1, wherein
   at least one of said pair of cylindrical members comprises an axially-bored hub section integral at its inner end in said chamber with its associated carrier plate, and
   said third cylindrical member comprises a drive shaft rotatably journaled intermediate its ends in the bore in said hub section.

3. A speed changer as defined in claim 1, wherein said further gear and all of said multi-step gears comprise identical two-step gears.

4. A speed changer as defined in claim 3, wherein
   the pitch diameter of said one set of teeth of each planetary gear is less than the pitch diameter of the other set thereof, and
   the pitch diameter of said one set of teeth of said further gear is the same as that of said one set of each planetary gear.

5. A speed changer as defined in claim 4, wherein
   a single planetary cluster gear is mounted to rotate on each of said shafts, and
   each of said shafts is slightly longer than the hub of the associated cluster gear and has a portion at one end thereof registering axially with, and spaced radially from, the teeth on the other section of said further gear, whereby the last-named teeth are not utilized in the drive system of the speed changer.

6. A speed changer as defined in claim 1, wherein
   there are a like plurality of multi-step planetary cluster gears rotatably mounted on each of said shafts,
   a fourth cylindrical member projects into said chamber coaxially of said axis and from the end of the housing opposite to that in which said third cylindrical member is mounted, and
   at least one additional multi-step gear is rotatably mounted on said fourth cylindrical member in driving engagement with a second group of said planetary cluster gears, there being at least one of said additional multi-step gears for each additional group of planetary cluster gears in excess of said first set.

7. A speed changer as defined in claim 6, wherein
   one of said sets of planetary gears comprise a plurality of identical, three-step cluster gears having the teeth of a first section thereof drivingly engaged with one of said additional, multi-step gears, and having the teeth of a second section thereof drivingly engaged with said internal sun gear,
   said cylindrical member in said opposite end of said housing has an internal gear secured to and projecting from the inner end thereof coaxially of said axis, and
   the teeth on the third section of each of said three-step cluster gears are drivingly engaged with the teeth of the last-named internal gear thereby to effect rotation of the latter in response to the rotation of said carrier plates.

8. A speed changer as defined in claim 1, wherein said housing comprises a pair of similar, generally dish-shaped sections releasably secured together around their edges and defining therebetween said chamber, said carrier plates are circular and have annular hub portions journaled in said housing sections centrally thereof and defining said pair of cylindrical members, and said third cylindrical member comprises a drive shaft journaled intermediate its ends in one of said hub portions of one of said plates, whereby said drive shaft and the hub in which it is journaled are disposed to rotate at different speeds at one end of said housing.

9. A speed changer as defined in claim 8, wherein, said multi-step gears are two-step gears, and the speed ratio of said drive shaft to said hub in which it is journaled can be determined by the formula:

$Rc = 1 + (AE/BF)$, where $A$ = the size of the said sun gear, $B$ = the size of said one section of any one of said planetary gears, $E$ = the size of the other section of any one of said planetary gears, and $F$ = the size of said further gear, the size of a respective gear referring in each case to its number of teeth or pitch diameter.

10. A speed changer as defined in claim 8, wherein even multiples of said planetary gears and said further gears are interposed between said pair of cylindrical members and said third cylindrical member to effect said difference in rotation therebetween.

* * * * *